United States Patent
Keränen et al.

(10) Patent No.: US 7,164,411 B2
(45) Date of Patent: Jan. 16, 2007

(54) OPTICAL USER INTERFACE FOR CONTROLLING PORTABLE ELECTRIC DEVICE

(75) Inventors: Kimmo Keränen, Oulu (FI); Jukka-Tapani Mäkinen, Oulu (FI); Timo Kolehmainen, Oulu (FI)

(73) Assignee: Nokia Corporatoin, Espoo (FI)

( * ) Notice: Subject to any disclaimer, the term of this patent is extended or adjusted under 35 U.S.C. 154(b) by 569 days.

(21) Appl. No.: 10/747,330

(22) Filed: Dec. 29, 2003

(65) Prior Publication Data

US 2004/0164953 A1    Aug. 26, 2004

(30) Foreign Application Priority Data

Dec. 30, 2002    (EP) ................... 02396192

(51) Int. Cl.
*G09G 5/00* (2006.01)
(52) U.S. Cl. .................... 345/156; 382/313
(58) Field of Classification Search ............. 345/156, 345/166, 168, 175; 382/312, 313, 315
See application file for complete search history.

(56) References Cited

U.S. PATENT DOCUMENTS

| 4,784,484 A | 11/1988 | Jensen |
| 5,195,145 A | 3/1993 | Backus et al. |
| 5,801,681 A * | 9/1998 | Sayag .................. 345/157 |
| 5,943,233 A * | 8/1999 | Ebina et al. ............. 700/85 |
| 6,324,310 B1 * | 11/2001 | Brownlee ............... 382/312 |
| 6,360,004 B1 | 3/2002 | Akizuki |
| 6,552,713 B1 * | 4/2003 | Van Brocklin et al. ..... 345/157 |
| 6,847,350 B1 * | 1/2005 | Van Brocklin et al. ..... 345/157 |
| 2001/0050765 A1 | 12/2001 | Vanderkooy et al. |
| 2003/0120925 A1 * | 6/2003 | Rose et al. .............. 713/176 |

OTHER PUBLICATIONS

Tekalp, Digital Video Processing, section II, Upper Saddle River, NJ, Prentice Hall, 1995.
Seferidis et al., "General approach to block-matching motion estimation", In Optical Engineering, vol. 32, pp. 1464-1474, Jul. 1993.

* cited by examiner

*Primary Examiner*—Ricardo Osorio
(74) *Attorney, Agent, or Firm*—Hollingsworth & Funk, LLC

(57) ABSTRACT

An optical user interface for controlling a portable electric device, such as a portable phone is provided. The user interface comprises a stripe-like optical contact surface, on which the finger of the user of the electric device is placed. A series of images of the fingerprint is taken and processed such that a motion vector or an image of the fingerprint is obtained. The invention provides a small-sized and economical user interface in terms of battery consumption and manufacturing costs.

18 Claims, 3 Drawing Sheets

OPTICAL USER INTERFACE FOR CONTROLLING PORTABLE ELECTRIC DEVICE

FIELD

Figure 1:
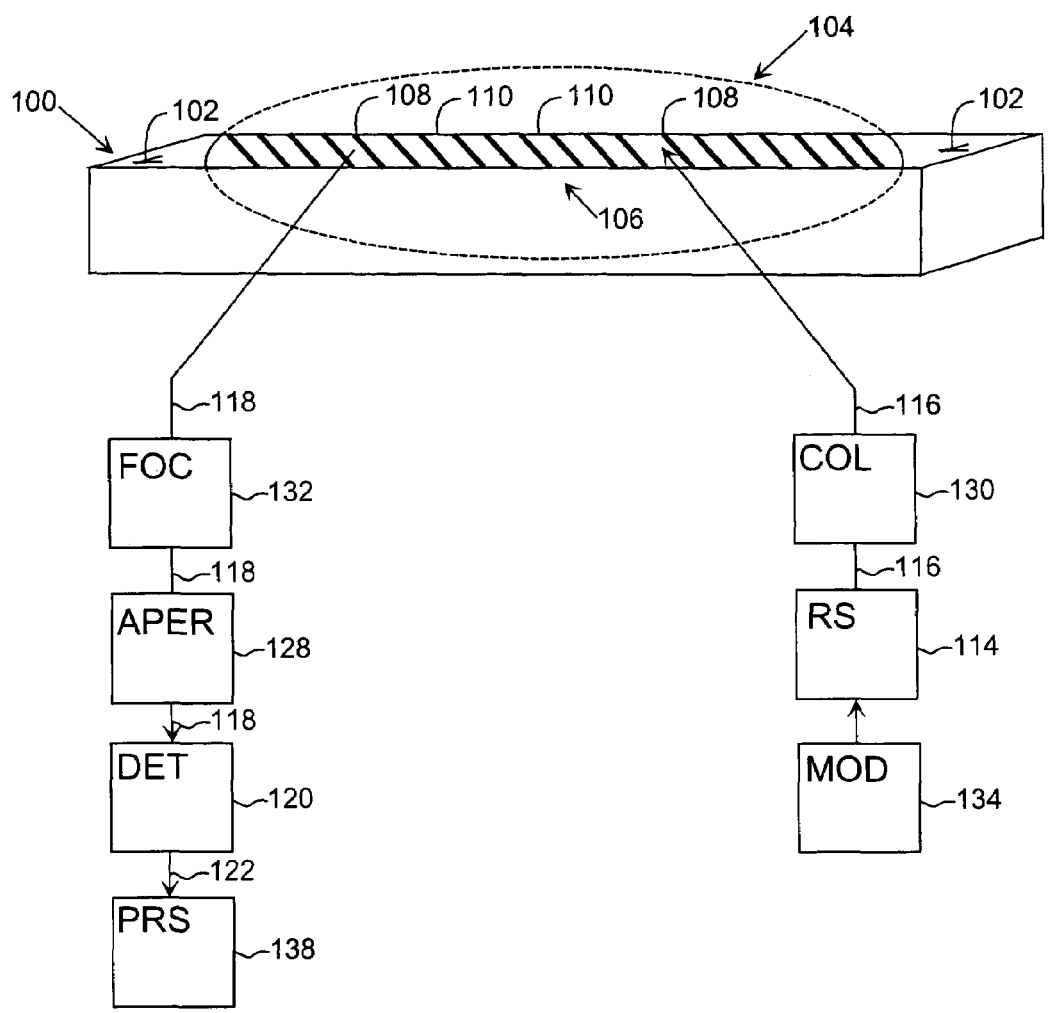

The invention relates to an optical user interface for controlling a portable electric device, such as a mobile phone.

BACKGROUND

A user interface is considered as an interface, via which a user can interact with a device the user is operating. The user interface typically consists of an input device, such as a keyboard, by which the user controls the functions of the device, and an output device, such as a display, for graphically indicating the user about the outcome of the control. In a graphical environment, it is customary to use mechanical pointing devices, such as a mouse or a trackball, for moving a pointer on the display. The mechanical pointing devices are, however, relatively large in size and unreliable due to exposure to mechanical stress and dirt.

Optical user interfaces are also suggested, which are based on using the user's finger to control a pointing device. Such interfaces include a scanning surface, on which the user's finger is placed. The scanning surface is illuminated, and an image of the fingerprint is recorded with a camera placed underneath the scanning surface. The size of the scanning surface is selected such that it substantially exceeds the contact area generated when the user presses his finger against the scanning surface.

The prior art optical user interfaces are, however, not designed for a portable electric device, such as a mobile phone, where small battery consumption and low manufacturing costs are required. In prior art optical user interfaces, the scanning surface is relatively large, and therefore, the required optical power of the light source illuminating the scanning surface as well as the size of the camera forming the image of the fingerprint cause high costs and substantial power consumption. Therefore, it is desirable to consider alternative techniques for providing optical user interfaces.

BRIEF DESCRIPTION OF THE INVENTION

It is an object of the invention to provide an optical user interface suitable for portable electric devices. This is achieved with an optical user interface for controlling a portable electric device, the user interface comprising: an optical contact means for forming at least a portion of a fingerprint when contacting the contact means with a finger; illuminating means for illuminating at least a portion of the optical contact means using primary optical radiation so that secondary optical radiation representing the portion of the fingerprint is generated; and detecting means for receiving at least a portion of the secondary optical radiation and converting the portion of the secondary optical radiation into an electric signal, the electric signal representing the portion of the fingerprint and being used for controlling the electric device. According to the invention, the optical contact means comprises a stripe-like optical contact surface, with which the finger is brought into contact for forming a slice of the fingerprint; the illuminating means are arranged to confine the illumination to the stripe-like optical contact surface; and the detecting means are arranged to confine the reception of the secondary optical radiation to the stripe-like optical contact surface and converting the secondary optical radiation into an electric signal, the electric signal representing the slice of the fingerprint.

Preferred embodiments of the invention are described in the dependent claims.

The optical user interface according to the invention provides several advantages. In an aspect of the invention, the invention provides a pointing device with an effective use of illumination and detecting resources thus reducing manufacturing costs and power consumption. According to an embodiment of the invention, a small sized optical user interface suitable for a portable electric device is obtained. In another aspect, the invention provides a fingerprint scanning device with an effective use of illumination and detecting resources.

LIST OF DRAWINGS

Figure 2:
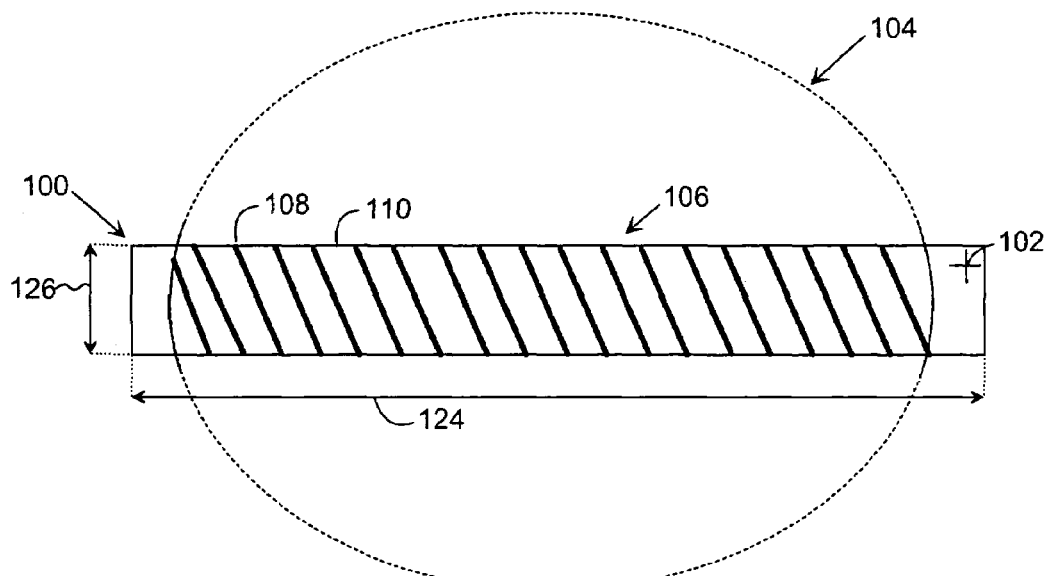
Figure 3:
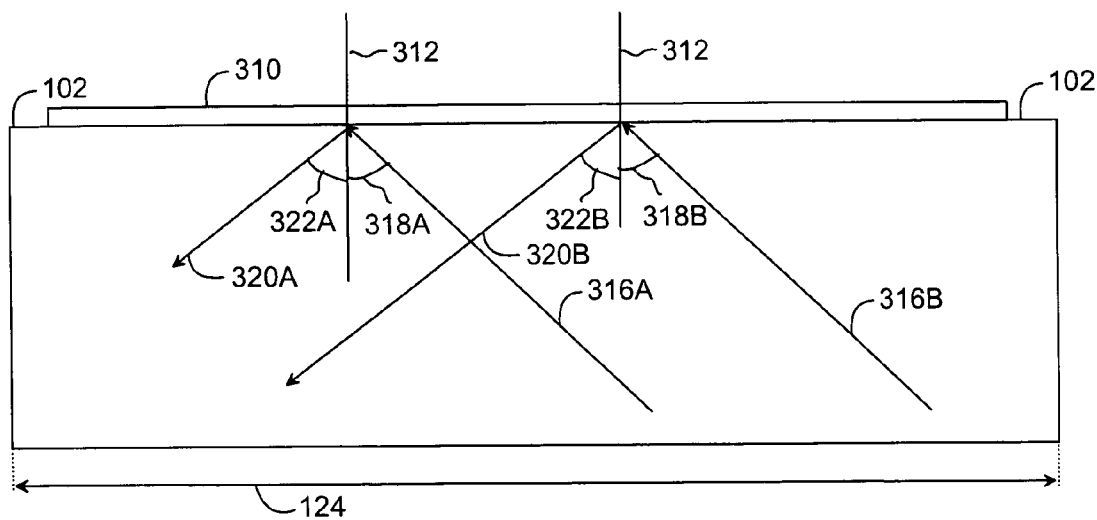
Figure 4:
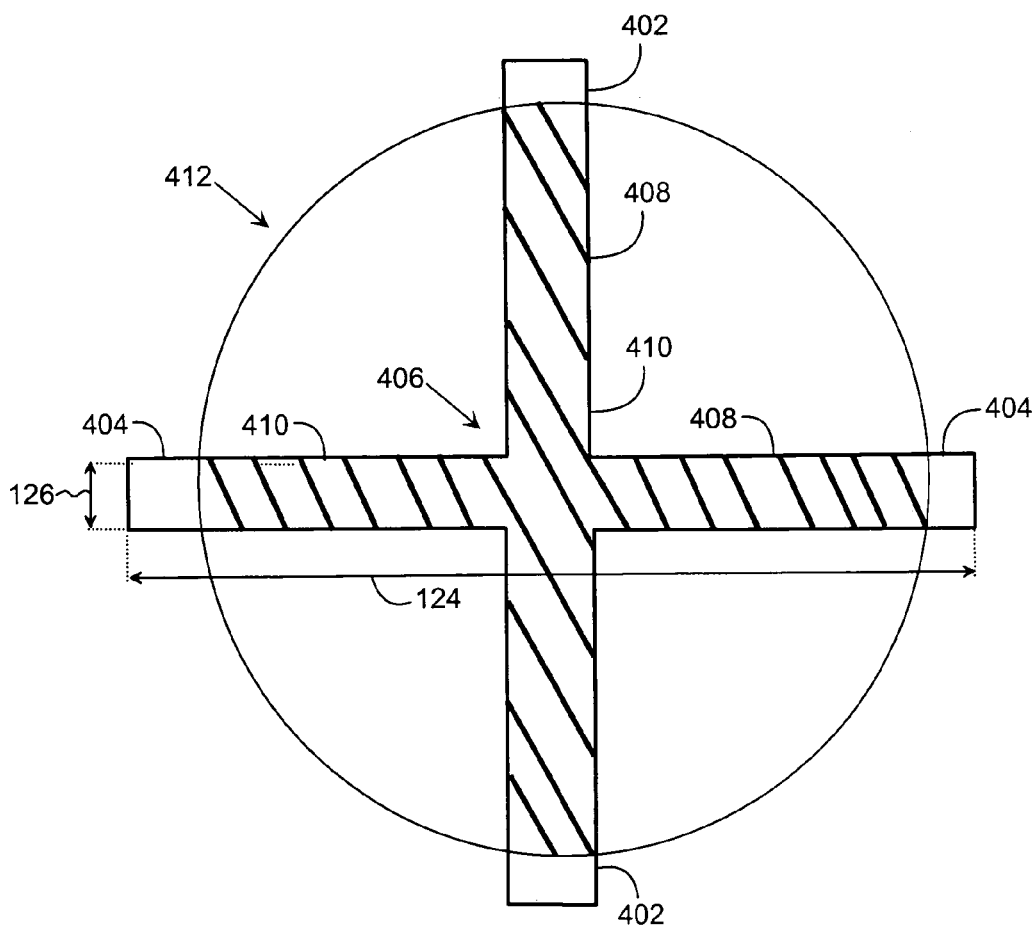
Figure 5:
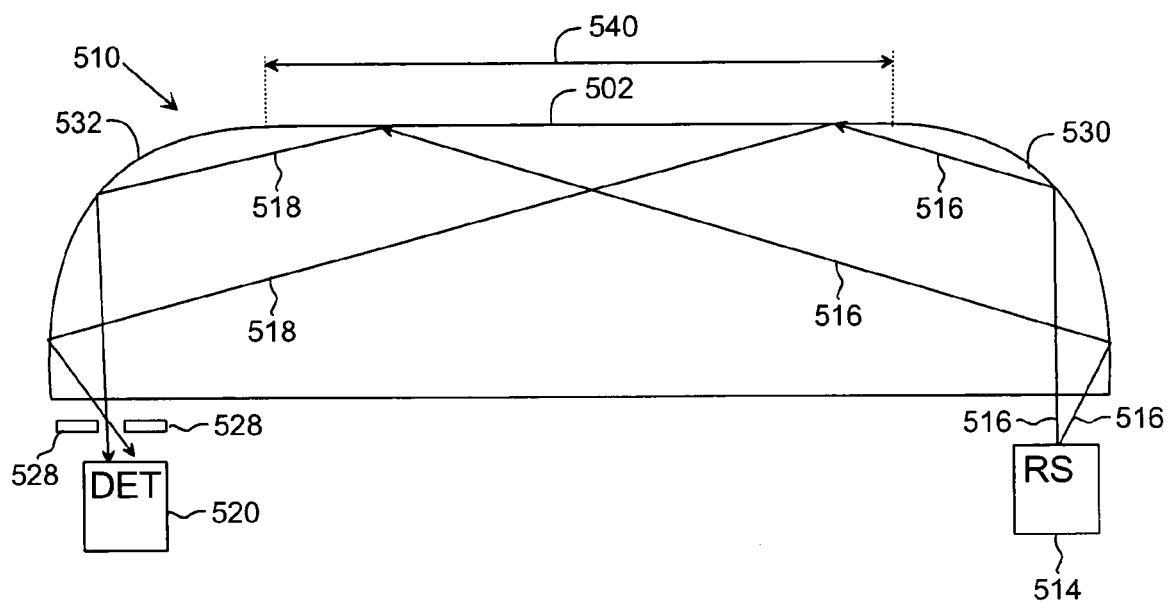
Figure 6:
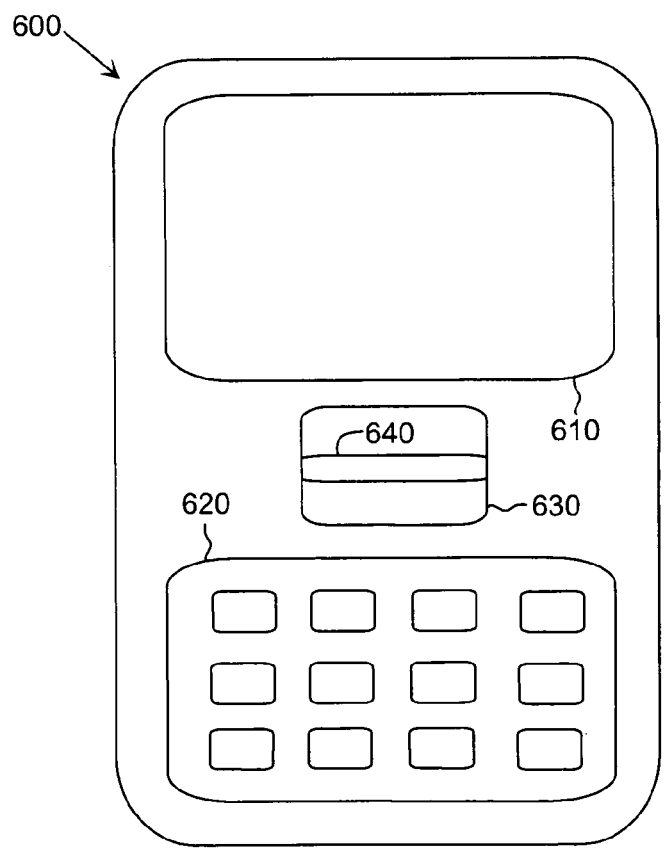

In the following, the invention will be described in greater detail with reference to the preferred embodiments and the accompanying drawings, in which FIG. 1 shows an example of an optical user interface according to the invention by means of a block diagram;

FIG. 2 shows a top view of an example of an optical user interface according to the invention, FIG. 3 shows a side view of an example of an optical user interface according to the invention, and FIG. 4 illustrates a preferred embodiment of the invention, and FIG. 5 illustrates another preferred embodiment of the invention, and FIG. 6 illustrates an application of the invention in a mobile phone.

DESCRIPTION OF EMBODIMENTS

With reference to FIG. 1, let us examine an example of an optical user interface according to the present invention by means of a block diagram. The optical user interface can be applied in portable electric devices, such as mobile phones, portable computers, and wireless mice. The optical user interface comprises an optical contact means 100 for forming at least a portion of a fingerprint 104 when contacting the contact means 100 with a finger. The optical contact means 100 comprises a stripe-like optical contact surface 102, with which the finger is brought in contact for forming a slice 106 of the fingerprint 104. The optical contact means 100 is transparent to optical radiation so that the stripe-like optical contact surface 102 can be illuminated through the optical contact means 100 using optical radiation. The optical contact means 100 can be an optically transparent member made of glass or plastic, for example. The optical material is transparent to optical radiation that is used for observing the portion of the fingerprint 104. Therefore, the optical material of the contact means 100 may be transparent to infrared wavelengths, but absorbs visible wavelengths, or vice versa. In this context, the fingerprint 104 is associated with a figure that is formed, for example, by pressing a dyed finger against an absorbing material, such as paper, so that the raised figure of the finger becomes visible. The raised figure of the fingerprint 104 comprises grooves 110 and ridges 108. According to the invention, the slice 106 of the fingerprint is formed when the finger is pressed against the stripe-like surface 102 of the optically transparent material, such as glass of optical plastic. The physical mechanism of fingerprint formation is based on altering the optical properties of the interface, in which the stripe-like contact surface 102 participates. More precisely, the fingerprint formation is based on the relative refractive indices of the optical contact means 100 and on the skin of the finger. In an embodiment of the invention, the optical contact means is made of polymethylmethacrylate (PMMA) having refractive index of n=1.486. A typical refractive index for human skin is n=1.53. When the finger is pressed against the stripe-like optical contact surface 102, the grooves 110 of the finger form an air interface with the optical material of the contact means 100. The ridges 108 of the finger, on the other hand, form a skin interface with the optical contact surface 102. Since the refractive indices of human skin (n=1.53) and that of air (n=1) are somewhat different, the optical properties of the stripe-like optical surface 102, such as absorbance and reflectance, depend on the structure of the raised figure that is characteristic to a finger. In an embodiment of the present invention, the stripe-like optical contact surface 102 is a plane surface, so that the light incident to the plane surface through the optical contact means 100 reflects at the same angle regardless of the surface point the light hits. In another embodiment, the stripe-like optical surface 102 has an elliptical form, so that a light beam transmitted from a first focal point of the ellipse is focused into a second focal point of the ellipse regardless of the surface point the light hits. The curvature of the stripe-like surface 102 can be chosen so as to achieve appropriate dimensions of the optical user interface can be achieved, and can be performed by a person skilled in the art without substantial difficulty.

With reference to FIGS. 2 and 3 dimensions of the optical contact means 100 and the stripe-like optical contact surface 102 are considered. In FIG. 2, the stripe-like optical contact surface 102 is shown in the plane of the paper so that the finger of the fingerprint 104 under inspection is pressed from the top. In FIG. 3, the optical contact means 100 and the stripe-like optical contact surface 102 are shown in side view.

In an embodiment of the invention, the stripe-like optical contact surface 102 comprises a first dimension 126 of the order of the fine structure size, such as the width of a ridge 108, of a fingerprint 104 of a human finger. The fine structure represents the raised figure characteristic to skin of the human finger. The fine structure comprises the grooves 110 and ridges 108 that are renewable structures in human skin and can therefore also be used for identification purposes. The width of the grooves 110 and the ridges 108 of the fingerprint may vary from 0.2 mm to 1 mm. In an embodiment of the invention, the first dimension 126 of the stripe-like contact surface is more than 0.5 mm but less than 3 mm.

In an embodiment of the invention the stripe-like optical contact surface 102 comprises a second dimension 124 of the order of the width of a human finger. The width of a human finger may vary from about 0.5 cm to 2 cm depending on the size and age of the person. It is preferable to dimension the stripe-like optical contact surface 102 so that the fingerprint 104 can be tracked by combining snapshot images taken from the fingerprint 104 when the finger is moved on the stripe-like contact surface 102. As the first dimension 126 of the stripe-like optical contact surface is increased, the time gap between successive snapshots can be increased as a larger portion of the fingerprint 104 imaged at a time. However, by increasing the first dimension 126 of the stripe-like optical contact surface 102, the size of the detector needed in the imaging is also increased. The second dimension 124 of the stripe-like optical contact surface 102, which is typically larger than the first dimension 126, can be chosen such that an image of the entire fingerprint 104 can be recorded by sweeping the finger over the stripe-like optical contact surface. 102 essentially perpendicularly to the second dimension 124. It is noteworthy that also a portion of the fingerprint is sufficient for identification purposes. Therefore, the second dimension 124 can also be substantially less than the width of a human finger. In an embodiment of the invention, the first and second dimensions 126, 124 of the stripe-like optical contact surface 102 are such that the entire stripe-like optical contact surface 102 is covered by the finger when the finger is pressed onto the surface 102. In such a case, the optical resources, such as illumination and detection, can be fully utilized since the entire stripe-like optical contact surface 102 contains information on the fingerprint 104.

In an embodiment of the invention, the stripe-like optical contact surface 102 comprises a coating 310 for protecting the stripe-like optical contact surface 102 from physical stress. The coating 310 is shown in FIG. 3 and can be made of abrasion and moisture resistive coating material, such as silicone resin (e.g. Gelest HardSilÔ). The refractive index of the coating should match as closely as possible the refractive index of the material of the optical contact means 100.

With reference to FIG. 1, the optical user interface according to the invention further comprises illumination means 114 for illuminating the stripe-like contact surface 102 using primary optical radiation 116. The illumination is performed so that secondary optical radiation 118 representing the slice 106 of the fingerprint 104 is generated. The formation of the secondary optical radiation 118 is based on interaction between the primary optical radiation 116 and the stripe-like optical contact surface 102. When the finger is pressed against the stripe-like optical contact surface 102, a portion of the primary optical radiation 116 is at least partially absorbed by the fine details of the finger that are in a physical contact with the stripe-like contact surface 102. The portion of the finger not contacting the stripe-like optical contact surface 102 is reflected, thus generating the secondary optical radiation 118.

In an embodiment of the invention, the illuminating means 114 comprises a laser radiation source. The laser radiation is typically monochromatic and coherent. The monochromaticity is an advantageous property as the optical power can be concentrated at suitable wavelengths in terms of other optical components, such as the detector and optical material that forms the stripe-like optical contact surface 102. Also, the optical design of the optical layout of the user interface is eased by the fact that the wavelength dependence of the optical properties, such as the refractive index of the optical contact means 100, do not play an important role. In an embodiment of the invention, the illumination means 114 is a diode laser, such as a 780 nm laser diode. Diode lasers can be produced in bulk, thus reducing the manufacturing costs. Furthermore, diode lasers are small in size and provide high optical power with relatively low current consumption.

In an embodiment of the invention, the illuminating means 114 comprises a point-like radiation source. The point-like radiation source enables a precise imaging of the slice 106 of the fingerprint 104. For example, collimating the primary optical radiation 114 is substantially enhanced by using a point-like radiation source. The point-like radiation can be achieved, for example, by using diode lasers.

In an embodiment of the invention, the user interface comprises a modulating means 134 shown in FIG. 1 connected to the illuminating means 114 for modulating the primary radiation 116. The modulation means 134 can be implemented in the power supply of the illuminating means 114. For example, the operating current or voltage of a diode laser can be used for modulating the primary optical radiation 116. The modulation of the primary optical radiation 116 also modulates the secondary optical radiation 118. The advantages provided by the modulation of the primary optical radiation 116 are, for example, sharp snapshot imaging of the slice 104 of the fingerprint 102 and reduction in power consumption while the illumination means 114 is switched off during modulation. The modulation frequency depends on the dimensions of the stripe-like contact surface 102 and the speed of the finger that swipes the stripe-like contact surface 102. For example, for a stripe-like optical surface 102 having a first dimension of 1 mm, the maximum modulation frequency should be 400 Hz, when one assumes that a 2 cm portion of of a finger is swept over the stripe-like optical surface 102 in 0.1 seconds. The maximum modulation frequency corresponds to the assumed maximum finger sweeping speed of 20 cm/s. The sweeping speed of the finger can be estimated using correlation calculations of successive frames. Modulation frequency can be adjusted according to the sweeping speed. The 2 cm long area is covered by 40 frames with 50% overlapping compared to the previous frame. The sampling frequency may be lower, when the device is used to control the user interface, because in such an application, the finger movement is slower.

In an embodiment of the invention, the user interface comprises collimating means 130 between the illuminating means 114 and the optical stripe-like optical contact surface 102 for collimating the primary optical radiation 116. The collimated optical radiation enables a homogeneous illumination of the stripe-like optical contact surface 102, and thus provides a uniform contrast in the image of the slice 106 of the fingerprint 104. The primary optical radiation 116 is taken from the illuminating means 114 to the collimating means 130, after which the primary optical radiation 116 consists of parallel beams 316A, 316B shown in FIG. 3. The parallel beams 316A, 316B are incident to the stripe-like optical contact surface 102 with similar angles 318A, 318B. It is customary to define the angle of incidence as an angle between the normal 312 of the surface and the incident beam 316A, 316B. In an embodiment of the invention, a cone of the primary optical radiation 116 produced by a point like-radiation source 114 is taken to an aspheric mirror, which collimates the primary optical radiation 116. In another embodiment, the cone of the primary optical radiation 116 is collimated with a lens.

With reference to FIG. 3, let us consider the incidence angles 318A, 318B of the beams 316A, 316B of the primary optical radiation 116. The incident angles 318A, 318B can be adjusted by suitably positioning the collimating means 130 relative to the stripe-like optical contact surface 102 and the illuminating means 114, and by applying appropriate optical dimensioning to the input optics, such as mirrors and lenses. In an embodiment of the invention, the incidence angle 318A, 318B of the primary radiation 316A, 316B relative to the stripe-like optical contact surface 102 is such that the primary radiation 316A, 316B is totally reflected in an interface between air and the stripe-like optical contact surface 102. As a consequence, the grooves 110 of the fingerprint 104 form a strongly reflective area on the stripe-like optical contact surface 102. With the refractive index of PMMA of n=1.486 and that of air n=1, the incident angle 318A, 318B should exceed the order of 42 degrees.

In an embodiment of the invention, the incidence angle 318A, 318B of the primary radiation 316A, 316B relative to the stripe-like optical contact surface 102 is such that an absorption and scattering of the primary radiation 316A, 316B occurs at a contact point between the stripe-like optical contact surface 102 and a ridge 108 of the fingerprint 104. The absorption and scattering are based on the fact that at contact points, a portion of the primary optical radiation 116 is penetrated into the skin, and the contrast between the contact points and the air interface points is increased, thus improving the image quality of the slice 106 of the fingerprint 104.

In an embodiment of the invention, the incident angle 318A, 318B of the primary radiation 316A, 316B relative to the stripe-like optical contact surface 102 is such that the primary radiation 318A, 318B is totally reflected in an interface between the stripe-like optical contact surface 102 and an optical impurity characteristic to a human finger. The optical impurity can, for example, be grease provided with refractive index n=1.47 and water provided with refractive index 1.33. The impurities mentioned above easily form stains on the stripe-like optical contact surface and may reduce the quality if the image of the slice 106 of the fingerprint 104. However, with appropriate incident angles 318A, 318B of the primary radiation 316A, 316B, total internal reflection occurs in the stains, and the quality of the image is not affected.

The optical user interface comprises a detecting means 120 for receiving the secondary optical radiation 118 from the stripe-like optical contact surface 102 and for converting the secondary optical radiation 118 into an electric signal 122. The electric signal 122 represents the slice 106 of the fingerprint 104, and is used for controlling the portable electric device. In an embodiment of the invention, the detecting means 120 is a space-sensitive detector, such as a CCD (Charge Coupled Device), which is a semi-conducting device, where the accumulation and storage of charges take place when interacting with electromagnetic radiation. Also, a CMOS-image sensor (Complementary Metal Oxide Semiconductor) can be used. A space-sensitive detector comprises rows and columns, each one of which consisting of at least one pixel. A space-sensitive detector is capable of measuring the radiation pixel-specifically, and converting the pixel-specific measurements into a pixel-specific electric signal 122. As a consequence, the detecting means 120 is capable of forming an image of the slice 106 of the fingerprint 104 using the secondary optical radiation 118. If the stripe-like optical surface 102 is an optically planar surface, i.e. the incident angle 318A, 318B of the primary optical radiation 316A, 316B and the angle of departure 322A, 322B of the secondary optical radiation 320A, 320B are identical, the detecting means 120 can be located perpendicularly to the secondary optical radiation 320A, 320B immediately after the stripe-like optical contact surface 102 without further optical components. The number of pixels in the detecting means 120 depends on the dimensions 124, 126 of the stripe-like optical contact surface 102 and on the resolution required to obtain a sufficient accuracy for fingerprint imaging. The invention enables to use a relatively small number of pixels due to the stripe-like optical contact-surface 102. In an embodiment of the invention, a resolution of 200 dpi (dots per inch) is sufficient when the user interface is used for controlling a pointing device. When the user interface is used for fingerprint recognition, an approximately 500 dpi resolution is required. The above figures correspond to 20×400 pixels when the dimensions 124, 126 of the stripe like optical surface are 1 mm×20 mm. The aspect ratio in the second dimension can be of the order of 1/10. The resulting sensor effective area is 1 mm×2 mm.

In an embodiment of the invention, the optical user interface comprises focusing means 132 between the stripe-like optical contact surface 102 and the detecting means 120 for collecting the secondary radiation 320A, 320B into the detecting means 120. The focusing means 132 can be implemented with an aspheric mirror or lens, which is adjusted to collect the secondary optical radiation 320A, 320B and to focus the secondary optical radiation 320A, 320B. The focusing means 132 can also be adjusted so that the geometry of the optical arrangement becomes suitable for the specific technical environment. For example, it may be advantageous to have a thin optical arrangement so that the user interface can easily be applied in portable electric devices.

In an embodiment of the invention, the optical user interface comprises aperture means 128 between the stripe-like optical contact surface 102 and the detecting means 120 for reducing stray radiation entering the detecting means 120. The stray radiation may originate from optical impurities on the stripe-like optical contact surface 102 or from optical aberration that occurs in the optical components, such as mirrors and lenses. Also, the stray radiation may originate from the environment of the optical user interface, if the optical user interface is not properly optically insulated. The aperture means 128 can be a pinhole or a slit, through which the secondary optical radiation 320A, 320B is guided. The aperture means 128 may also comprise a cylinder-like structure. The aperture means 128 can be located in the focal point of the focusing means 132.

In an embodiment of the invention, the optical user interface comprises processing means 138 coupled with the detecting means 120 for forming a motion vector using the electric signal 122. The motion vector can be used for moving a pointer on a display of the electric device. The processing means 138 include for example, a digital processor and software. The digital processor can, for example, be a processor of a mobile phone. The formation of the motion vector is based on the correlation between successive snapshots taken from the fingerprint 104. The formation of the motion vector from a signal 122 originating from the detecting means 120 is described in further detail in the publication by A. Murat Tekalp, Digital Video Processing, Upper Saddle River, N.J.: Prentice Hall, 1995, and will therefore be incorporated herein by reference.

Let us consider an example of a motion estimation method that can be applied in the present invention. The motion estimation can be implemented in the processing means 138 by a software application. The ultimate task of motion estimation is to estimate image plane correspondence vectors $d(x,t; I\Delta t)=[d_1(x,t;I\Delta t), d_2(x,t;I\Delta t)]T$ between two moments t and t+IΔt, where I is an integer.

In an embodiment of the invention, the determination of the correspondence vectors is based on block-based motion estimation. The block-motion model assumes that the image of the slice 106 of the fingerprint 104 is composed of moving blocks. The simplest form of this model restricts the motion of each block to a pure translation. In such a case, an N X N block in frame k centered about the pixel $n=(n_1, n_2)$ is modelled as a globally shifted version of a same-size block in frame k+I, for an integer I. Generalized block motion can be characterized by a simple frame-to-frame pixel coordinate transformation in the form $$x_1'=x_1+d_1$$

$$x_2'=x2+d_2,$$

where vector $(x_1, x_2)$ denotes the coordinates of a point in frame k, and $(x_1', x_2')$ denotes the coordinates of the same point in frame k+I. The spatial transformation can be generalized to include bilinear coordinate transformations written as $$x_1'=a_1x_1+a_2x_2+a_3x_1x_2+a_4$$

$$x_2'=a_5x_1+a_6x_2+a_7x_1x_2+a_8.$$

The current frame is divided into rectangular or arbitrary quadrilateral patches. Then the best matching quadrilateral in the search frame under a given spatial transformation is searched for.

When eight unknown $a_i$ coefficient are involved, the motion estimation has to be performed in an 8-D parameter space in the case of bilinear transformation. The full-search method can be summarized as follows:

1. Segment the frame into rectangular blocks.
2. Perturb the coordinates of the corners of a matching quadrilateral in the search frame starting from an initial guess.
3. For each quadrilateral, find the parameters of a predetermined spatial transformation that maps this quadrilateral into a rectangular block in the current frame using the coordinates of the four matching corners.
4. Find the coordinates of each corresponding pixel within the quadrilateral using the computed spatial transformation, and calculate the MSE (Mean Squared Error) or MAD (Mean Absolute Difference) between the given block and the matching patch.
5. Choose the spatial transformation that yields the smallest MSE or MAD.

The full search is described in detail in reference: V. Seferidis and M. Ghanbari, "General approach to block-matching motion estimation," in Optical Engineering, vol. 32, pp. 1464–1474, July 1993, and will thereby be incorporated herein by reference.

In order to reduce the computational load imposed by generalized block-matching, generalized block-matching is only used for one or more blocks in the current fingerprint slice 106, since it is only necessary to estimate global finger motion. Several blocks may be used to estimate several motion vectors, and then the motion vectors may be averaged to smooth the estimated motion vector over time in order to smooth the cursor motion as used in the user interface to control the pointer or selection of menu items or icons.

The use of two perpendicular sensors is not necessary, since the motion vector can be estimated using only one sensor with sufficient width (1 mm or more) such that a reliable global motion vector can be estimated in any direction. However, two sensors make the estimation of the finger motion more reliable. Several strategies can be selected for the use of two perpendicular sensors:

The sensor capturing the largest image of the finger is used for motion estimation, giving flexibility and comfort when the sensor is used Global finger motion is estimated using both sensors, and the averaged motion vector is computed using the estimated motion vectors from two sensors, providing a smoother and a more reliable motion vector If only a one-dimensional motion vector is used, the sensor most parallel to the finger motion is used to estimate the motion vector, since the sampling rate for that sensor may be significantly reduced still providing enough of overlap for block correlation, thus reducing memory consumption and power consumption.

In an embodiment of the invention, the user interface comprises fingerprint formation means 140 coupled with the detecting means 120 for forming an image of the fingerprint 104 when the finger is swept over the stripe-like optical contact surface 102. The fingerprint formation means 140 can be implemented in a digital processor as a software application. In the fingerprint formation, the finger is swept over the, stripe like optical surface 102, and successive images of the slice 106 of the fingerprint 104 are taken and stored in memory of the fingerprint formation means 140. Then, the successive images are combined to form an image of a larger structure of the fingerprint 104. The adjustment of the successive images to each other can be improved by using the overlapping regions of the successive images. The image of the fingerprint can be further subjected to a fingerprint recognition for user authentication purposes.

With reference to FIG. 4, let us consider an embodiment of the invention, wherein the optical user interface further comprises a second stripe-like optical contact surface 404. The first stripe-like optical contact surface 402 and the grooves 410 and the ridges 408 of the fingerprint 412 are also shown. The second stripe-like contact surface 404 improves the two dimensional performance of the optical user interface. In an embodiment of the invention, the second stripe-like optical contact surface 404 has a crossing 406 with the first stripe-like optical contact surface 402. The two stripe-like contact surfaces can be positioned perpendicularly with respect to each other. The possible embodiments of the second stripe-like optical contact surface 404 are similar to those of the first stripe-like optical contact surface 402. In this embodiment, the second stripe-like optical contact surface 404 is connected to a second illuminating means and to a second detecting means. A separate electric signal corresponding to signal 122 is used to form the motion vector.

With reference to FIG. 5 let us examine an optical arrangement according to the present invention. A stripe-like optical contact surface 502 is arranged on the surface of an optical member 510, which can be made of PMMA using injection moulding techniques, for example. An illuminating means 514, such as a laser point source, is located underneath the optical member 510. Primary radiation 516 produced by the illuminating means 514 is directed to an aspheric mirror 530 planted on the surface of the optical member 510. The reflectivity of the aspheric mirror 530 can be obtained using a metal film, for example. The aspheric mirror 530 collimates the primary optical radiation 516, and directs the collimated primary optical radiation 516 on the stripe-like optical contact surface 502. An effective area 540 of the stripe-like optical contact surface 502 is also shown. The collimated primary optical radiation 516 is reflected from the stripe-like optical contact surface 502 forming the secondary optical radiation 518 representing the slice 106 of the fingerprint 104. In this embodiment, the stripe-like optical contact surface 502 is a flat surface, and therefore, the secondary optical radiation 518 is also collimated. The collimated secondary optical radiation 518 is directed at focusing optics 532, for example an aspheric mirror. In this case, the collimating aspheric mirror 530 and the focusing aspheric mirror 532 may be identical. The focused secondary optical radiation 518 is taken through the aperture means 528, such as a pinhole or a slit, and then to the surface of detecting means 520.

With reference to FIG. 6, let us consider the application of the user interface in a mobile phone 600. The mobile phone comprises a display 610, a keyboard 620, 630, and an optical user interface 640. The keyboard 620,630 includes, for example, an alphanumerical keyboard 620 and at least one function key 630. In an embodiment of the invention, the optical user interface 640 is integrated into the keyboard 620, 630 of the mobile phone. For example, the optical user interface can be located in the function key 630, which is usually operated using a thumb. This embodiment enables to firmly hold the hand-held equipment with one hand.

In an embodiment of the invention, the optical user interface is switched on, when a key of the keyboard 620, 630 is pressed. This procedure reduces battery consumption, since the illuminating means 114 and the detecting means 120 are only functional when necessary. The user interface according to the invention can also be activated by utilizing a separate capacitive sensor adjacent to the user interface, which detects the presence of a finger. It is also possible to use a separate IR LED/IR-receiver pair, which detects the presence of a finger by sending IR-light upwards from the portable electrical device. In this solution, a strong received signal signifies the presence of an object like a finger, and the user interface is activated. The contact surface 102 can also be constantly monitored by the detecting means 120 so that the presence of a finger can be detected by analysing the detected image.

Even though the invention is described above with reference to an example according to the accompanying drawings, it is obvious that the invention is not restricted thereto, but it can be modified in various ways within the scope of the appended claims.

The invention claimed is:

1. An optical user interface for controlling a portable electric device, the user interface comprising:
   optical contact means for forming at least a portion of a fingerprint when contacting the contact means with a finger;
   illuminating means for illuminating at least a portion of the optical contact means using primary optical radiation so that secondary optical radiation representing the portion of the fingerprint is generated; and
   detecting means for receiving at least a portion of the secondary optical radiation and converting the portion of the secondary optical radiation into an electric signal, the electric signal representing the portion of the fingerprint and being used for controlling the electric device, wherein the optical contact means comprises a stripe-like optical contact surface, with which the finger is brought into contact for forming a slice of the fingerprint;
   wherein the illuminating means are arranged to confine the illumination to the stripe-like optical contact surface; and
   wherein the detecting means are arranged to confine the reception of the secondary optical radiation to the stripe-like optical contact surface and converting the secondary optical radiation into an electric signal, the electric signal representing the slice of the fingerprint.

2. The interface of claim 1, wherein the stripe-like optical contact surface comprise a first dimension of the order of the fine structure size, such as the width of a ridge, of a fingerprint of a human finger.

3. The interface of claim 1, wherein the stripe-like optical contact surface comprises a second dimension of the order of the width of a human finger.

4. The interface of claim 1, wherein the stripe-like optical contact surface comprises a coating for protecting the stripe-like optical contact surface from physical stress.

5. The interface of claim 1, wherein the illuminating means comprise a laser radiation source.

6. The interface of claim 1, wherein the illuminating means comprise a point-like radiation source.

7. The interface of claim 1, wherein the user interface comprises a modulating means connected to the illuminating means, for modulating the primary radiation.

8. The interface of claim 1, wherein the user interface comprises collimating means between the illuminating means and the optical stripe-like optical contact surface for collimating the primary radiation.

9. The interface of claim 1, wherein the incidence angle of the primary radiation relative to the stripe-like optical contact surface is such that the primary radiation is totally reflected in an interface between air and the stripe-like optical contact surface.

10. The interface of claim 1, wherein the incidence angle of the primary radiation relative to the stripe-like optical contact surface is such that an absorption and scattering of the primary radiation occurs at a contact point between the stripe-like optical contact surface and a ridge of the fingerprint.

11. The interface of claim 1, wherein the incidence angle of the primary radiation relative to the stripe-like optical contact surface is such that the primary radiation is totally reflected in an interface between the stripe-like optical contact surface and an optical impurity characteristic to a human finger.

12. The interface of claim 1, wherein the optical user interface comprises focusing means between the stripe-like optical contact surface and the detecting means, for collecting the secondary radiation into the detecting means.

13. The interface of claim 1, wherein the optical user interface comprises aperture means between the stripe-like optical contact surface and the detecting means, for reducing stray radiation entering the detecting means.

14. The interface of claim 1, wherein the detecting means includes a space-sensitive detector.

15. The interface of claim 1, wherein the optical user interface comprises processing means coupled with the detecting means, for forming a motion vector using the electric signal.

16. The interface of claim 1, wherein the user interface comprises fingerprint formation means coupled with the detecting means, for forming an image of the fingerprint when the finger is swept over the stripe-like optical contact surface.

17. The interface of claim 1, wherein the optical user interface is integrated into a keyboard of the device.

18. The interface of claim 1, wherein the optical user interface further comprises a second stripe-like optical contact surface.

* * * * *